Figure 1:
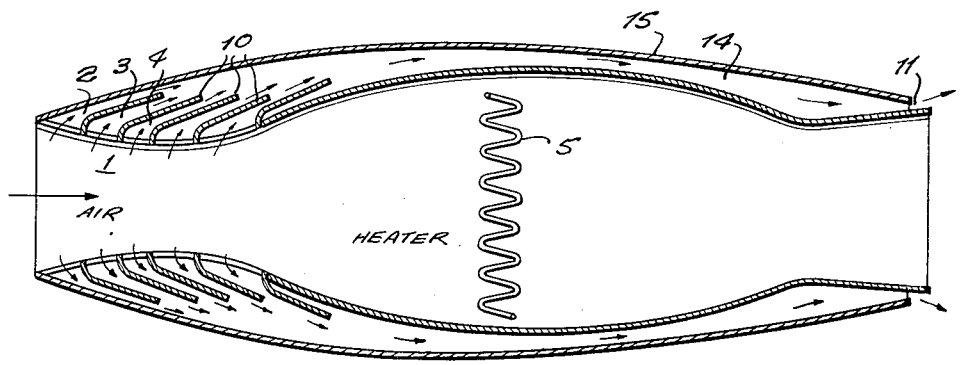

March 18, 1952 R. LEDUC 2,589,945
ATHODYD HAVING AIR PERMEABLE CONVERGING INTAKE
SECTION FOR BOUNDARY LAYER CONTROLS
Filed Feb. 26, 1948

AIRCRAFT RAM-JET ENGINE

INVENTOR.
RENÉ LEDUC
BY

Patented Mar. 18, 1952

2,589,945

UNITED STATES PATENT OFFICE 2,589,945

ATHODYD HAVING AIR PERMEABLE CONVERGING INTAKE SECTION FOR BOUNDARY LAYER CONTROLS

René Leduc, Toulouse, France

Application February 26, 1948, Serial No. 11,123
In France February 28, 1947

6 Claims. (Cl. 60—35.6)

In his British Patent No. 439,805, the applicant has described means for avoiding the detachment of the boundary layer from the walls which can occur in aero-thermodynamic ducts and the like. These means consist in sucking or blowing the said boundary layer locally at suitable points.

In the course of further research the applicant has discovered that the boundary layer problems which arise in the construction of duct and the like which work under supersonic conditions are very different from those which arise under subsonic conditions. This research has shown in particular, that at supersonic speeds, the tendency towards detachment of the boundary layer decreases with decrease of pressure and increases with increase of pressure. For example, if a supersonic duct comprising a convergent portion and a divergent portion connected by a neck is considered, it is found that within the convergent portion, the boundary layer corresponds to a compression zone and that the velocity of the fluid in this convergent portion continues to diminish until it equals the speed of sound at the neck. The fact that the boundary layer corresponds in the convergent portion to a pressure zone causes an intrinsically unstable condition which leads to a progressive thickening of this layer to the extent of completely blocking the duct and, therefore, to the production of a shock wave.

It is therefore impossible in practice to construct a supersonic duct without providing for correcting means which can set up an equilibrium between the boundary layer and the flow through the convergent portion, that is to say, to limit the thickening of the boundary layer.

The invention is concerned with such means. It consists essentially in forming the surface or surfaces along which the disturbances take place as a permeable wall through which the boundary layer is, in a sense, punctured by any suitable device. It is essential that the puncturing should occur uniformly over the whole of the surface or surfaces with which the boundary layer detachment is concerned.

The permeable wall can be made in various ways, for example it can be formed as a surface bored with very closely spaced holes, the size and distribution of these holes being a function of the mass of boundary layer to be evacuated per second and the area of the holes being up to one half of the surface which is perforated. Alternatively, it can be formed of a porous material, for example by a wall which is perforated by a great number of closely spaced holes.

The invention can be applied, in particular, to the formation of the internal surfaces of diffusers and ducts operating under supersonic conditions. In that case, the device will comprise suction chambers situated behind the permeable walls, the reduced pressure being produced preferably by connecting the said chambers to suitable zones of the aerofoil. The walls of the diffusers and ducts then become virtually profiled suction boxes.

Figure 2:
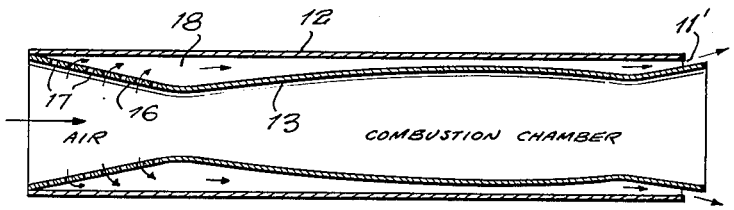

In order that the invention may be more easily understood and be more readily carried into effect, two examples of the practical application will now be described with reference to the accompanying drawing in which:

Figure 1 shows diagrammatically its application to a diffuser operating under supersonic conditions and Figure 2 shows diagrammatically a diffuser of special shape.

In the device shown in Figure 1, the inner wall 1 forming the convergent wall portion is airpermeable and porous. Behind this wall, partitions 10 are provided which define spaces 2, 3, 4 . . . in which suction is effected.

It can be of advantage to connect the spaces 2, 3, 4 . . . . to a zone of reduced pressure situated behind the fast moving body having an opening 11 through which the air can escape from the space 14 between the inner wall 1 and an outer wall 15.

Indeed at very high speeds of the order of 1000 metres per second, the amounts of air to be drawn in being more than 1 kg. per second per square metre, it can be difficult to absorb such masses in suitable machines.

The duct thus formed can be combined, if desired, with a source of heat 5.

Also in accordance with the invention, diffusers and ducts are preferably provided with outer contours which are as flat as possible or which are completely flat (that is to say plane or cylindrical), the necessary thickness being provided by the inner contour. As shown in Figure 2, being a sectional side elevation of an aircraft ram jet engine, a duct can be made in this way of a substantially cylindrical outer wall 12 and an inner wall 13. The inner wall 13 has a convergent inner wall portion 16 provided with apertures or holes 17 through which air is sucked into the space 18 between the inner wall 13 and the cylindrical outer wall 12. The air can escape through the opening 11' at the rear end of the duct.

The holes 17 are closely spaced and cover at least one half of the surface of the convergent portion 16.

Thus, the lifting surfaces which are normally provided externally can be provided internally and the fineness of the external contour improved in consequence.

It is to be understood that the features of the present invention, although they are particularly applicable to the surfaces of airplanes and the like, are of equal application to all objects which are displaced at high speed. Projectiles of all kinds can, in particular, be mentioned.

I claim:

1. In a duct forming part of an airplane to be moved at a supersonic speed and extending with its axis in direction of movement of said airplane, in combination, a convergent internal surface portion decreasing the cross-sectional area of said duct in downstream direction, an air permeable porous wall portion forming at least part of said convergent internal surface portion of said duct along which a thickening of the boundary layer occurs during movement of said duct at supersonic speed; and means for causing passage of air through said air permeable porus wall portion out of said duct at least during movement of the plane at supersonic speed.

2. In a duct forming part of an airplane to be moved at a supersonic speed and extending with its axis in direction of movement of said airplane, in combination, a convergent internal surface portion decreasing the cross-sectional area of said duct in downstream direction, an air permeable porous wall portion provided with closely spaced holes passing through the same, said air permeable porous wall portion forming part of said convergent internal surface portion of said duct; and means for sucking air through said air permeable porous wall portion out of said duct at least during movement of the plane at supersonic speed.

3. In a double walled duct forming part of an airplane to be moved at a supersonic speed and extending with its axis in direction of movement of said airplane, said duct having an inner and an outer wall forming a space between themselves, in combination, an air permeable porous convergent inner wall portion decreasing the cross-sectional area of said duct in downstream direction and being covered with closely spaced holes passing through the same, said air permeable porous convergent inner wall portion forming part of said inner wall of said duct; and means for sucking air through said air permeable porous convergent inner wall portion into the space between said inner and outer wall of said double walled duct at least during movement of the plane at supersonic speed.

4. In a double walled duct forming part of an airplane to be moved at a supersonic speed and extending with its axis in direction of movement of said airplane, said duct having an inner wall and an outer wall forming a space between themselves, said inner wall having a convergent portion decreasing the cross-sectional area of said duct in downstream direction, in combination, an air permeable porous wall portion forming part of said convergent portion of said inner wall; and means for sucking air through said air permeable porous wall portion into the space between said inner and outer wall of said double walled duct at least during movement of the plane at supersonic speed.

5. A double walled duct forming part of an airplane to be moved at a supersonic speed and extending with its axis in direction of movement of said airplane comprising in combination, an inner wall having a convergent inner wall portion decreasing the cross-sectional area of said duct in downstream direction; a substantially cylindrical outer wall arranged surrounding and spaced from said inner wall so as to form an air space between said inner wall and itself; an air permeable porous wall portion forming at least part of said convergent inner wall portion of said inner wall; and means for sucking air through said air permeable porous wall portion into the space between said inner wall and said substantially cylindrical outer wall of said double walled duct at least during movement of the plane at supersonic speed.

6. A double walled duct forming part of an airplane to be moved at a supersonic speed and extending with its axis in direction of movement of said airplane comprising in combination, an inner wall having a convergent inner wall portion decreasing the cross-sectional area of said duct in downstream direction; a substantially cylindrical outer wall arranged surrounding and spaced from said inner wall so as to form an air space between said inner wall and itself; an air permeable porous wall portion provided with closely spaced holes passing through the same and covering at least half of the surface of said air permeable porous wall portion, said air permeable porous wall portion forming at least part of said convergent inner wall portion of said inner wall; and means for sucking air through said air permeable porous wall portion into the space between said inner wall and said substantially cylindrical outer wall of said double walled duct at least during movement of the plane at supersonic speed.

RENÉ LEDUC.

REFERENCES CITED

The following references are of record in the file of this patent:

UNITED STATES PATENTS

| Number | Name | Date |
|---|---|---|
| 2,354,151 | Skoglund | July 19, 1944 |
| 2,401,584 | Rhines | June 4, 1946 |

FOREIGN PATENTS

| Number | Country | Date |
|---|---|---|
| 439,805 | Great Britain | Dec. 6, 1935 |
| 512,064 | Great Britain | Aug. 29, 1939 |
| 50,033 | France | Aug. 1, 1939 |//
| (3rd Addition to No. 779,655) | | |